United States Patent
Baumann et al.

(10) Patent No.: US 8,229,814 B2
(45) Date of Patent: *Jul. 24, 2012

(54) SYSTEM FOR PROCESSING A PURCHASE REQUEST FOR GOODS OR SERVICES

(75) Inventors: Carl Steven Baumann, Vestal, NY (US); Michael Randy May, Johnson City, NY (US); John Irving Munson, Binghamton, NY (US); William Montgomery Sjostrom, Rome, PA (US); Sherry Lee Wilson, Conklin, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/198,755

(22) Filed: Aug. 5, 2011

(65) Prior Publication Data

US 2011/0288955 A1 Nov. 24, 2011

Related U.S. Application Data

(63) Continuation of application No. 09/819,462, filed on Mar. 28, 2001, now Pat. No. 8,027,892.

(51) Int. Cl.
*H04M 15/00* (2006.01)
(52) U.S. Cl. .......................................................... 705/34
(58) Field of Classification Search .................... 705/34, 705/35
See application file for complete search history.

(56) References Cited

U.S. PATENT DOCUMENTS

| | | |
|---|---|---|
| 4,799,156 A | 1/1989 | Shavit et al. |
| 4,947,028 A | 8/1990 | Gorog |
| 5,021,953 A | 6/1991 | Webber et al. |
| 5,117,356 A | 5/1992 | Marks |
| 5,168,444 A | 12/1992 | Cukor et al. |
| 5,189,608 A | 2/1993 | Lyons et al. |
| 5,319,542 A | 6/1994 | King et al. |
| 5,335,169 A | 8/1994 | Chong |
| 5,361,393 A | 11/1994 | Rossillo |

(Continued)

FOREIGN PATENT DOCUMENTS

GB 2082814 A 3/1982

(Continued)

OTHER PUBLICATIONS

Lotus Development Corp., an IBM Subsidiary. Lotus Domino: Application Development with Domino Designer, Rel. 5. USA, privately printed, 1998. i-vii, 425-430.

(Continued)

*Primary Examiner* — Elda Milef
(74) *Attorney, Agent, or Firm* — Schmeiser, Olsen & Watts; William E. Schiesser

(57) ABSTRACT

An invoice processing system includes a requisition and catalog server (referred to as a Req/Cat Web, or RCW, server), a procurement services system (SAP), and a requester terminal (browser). ReqCat Web allows requesters to input requirements (requisitions) which ReqCat then passes to SAP, which creates purchase orders, sends them to vendors for fulfillment, receives the vendors invoices, and prepares the payments. Commodities may be designated as either receivable or non-receivable, and this designation is stored in ReqCat web and passed to SAP on inbound requisitions. Payments on invoices received for non-receivable items are approved via a positive confirmation process, and payments on invoices received for receivable items are approved via a negative confirmation process. Positive acceptance of an invoice by a requester of commodities triggers automatic generation of a goods received (move) ticket.

14 Claims, 2 Drawing Sheets

U.S. PATENT DOCUMENTS

| | | |
|---|---|---|
| 5,390,113 A | 2/1995 | Sampson |
| 5,544,298 A | 8/1996 | Kanavy et al. |
| 5,640,550 A | 6/1997 | Coker |
| 5,666,493 A | 9/1997 | Wojcik et al. |
| 5,694,551 A | 12/1997 | Doyle et al. |
| 5,712,989 A | 1/1998 | Johnson et al. |
| 5,715,453 A | 2/1998 | Stewart |
| 5,721,832 A | 2/1998 | Westrope et al. |
| 5,737,592 A | 4/1998 | Nguyen et al. |
| 5,758,327 A | 5/1998 | Gardner et al. |
| 5,758,351 A | 5/1998 | Gibson et al. |
| 5,781,908 A | 7/1998 | Williams et al. |
| 5,794,207 A | 8/1998 | Walker et al. |
| 5,799,151 A | 8/1998 | Hoffer |
| 5,802,518 A | 9/1998 | Karaev et al. |
| 5,815,829 A | 9/1998 | Zargar |
| 5,838,906 A | 11/1998 | Doyle et al. |
| 5,838,916 A | 11/1998 | Domenikos et al. |
| 5,870,717 A | 2/1999 | Wiecha |
| 5,918,017 A | 6/1999 | Attanasio et al. |
| 5,963,922 A | 10/1999 | Helmering |
| 5,963,925 A | 10/1999 | Kolling et al. |
| 5,970,475 A | 10/1999 | Barnes et al. |
| 5,974,407 A | 10/1999 | Sacks |
| 6,003,039 A | 12/1999 | Barry et al. |
| 6,006,204 A | 12/1999 | Malcolm |
| 6,014,134 A | 1/2000 | Bell et al. |
| 6,016,394 A | 1/2000 | Walker |
| 6,023,683 A | 2/2000 | Johnson et al. |
| 6,023,729 A | 2/2000 | Samuel et al. |
| 6,029,150 A | 2/2000 | Kravitz |
| 6,032,130 A | 2/2000 | Alloul et al. |
| 6,032,145 A | 2/2000 | Beall et al. |
| 6,032,150 A | 2/2000 | Nguyen |
| 6,047,268 A | 4/2000 | Bartoli et al. |
| 6,052,785 A | 4/2000 | Lin et al. |
| 6,055,516 A | 4/2000 | Johnson et al. |
| 6,055,519 A | 4/2000 | Kennedy et al. |
| 6,058,373 A | 5/2000 | Blinn et al. |
| 6,058,380 A | 5/2000 | Anderson et al. |
| 6,058,381 A | 5/2000 | Nelson |
| 6,064,977 A | 5/2000 | Haverstock et al. |
| 6,094,654 A | 7/2000 | Van Huben et al. |
| 6,104,717 A | 8/2000 | Coile et al. |
| 6,112,242 A | 8/2000 | Jois et al. |
| 6,115,690 A | 9/2000 | Wong |
| 6,125,363 A | 9/2000 | Buzzeo et al. |
| 6,128,602 A | 10/2000 | Northington et al. |
| 6,144,991 A | 11/2000 | England |
| 6,151,608 A | 11/2000 | Abrams |
| 6,163,805 A | 12/2000 | Silva et al. |
| 6,185,545 B1 | 2/2001 | Resnick et al. |
| 6,199,113 B1 | 3/2001 | Alegre et al. |
| 6,208,345 B1 | 3/2001 | Sheard et al. |
| 6,219,680 B1 | 4/2001 | Bernardo et al. |
| 6,239,797 B1 | 5/2001 | Hills et al. |
| 6,240,399 B1 | 5/2001 | Frank et al. |
| 6,260,024 B1 | 7/2001 | Shkedy |
| 6,269,343 B1 | 7/2001 | Pallakoff |
| 6,314,408 B1 | 11/2001 | Salas et al. |
| 6,317,751 B1 | 11/2001 | Yeger et al. |
| 6,330,575 B1 | 12/2001 | Moore et al. |
| 6,336,114 B1 | 1/2002 | Garrison |
| 6,343,284 B1 | 1/2002 | Ishikawa et al. |
| 6,343,287 B1 | 1/2002 | Kumar et al. |
| 6,356,283 B1 | 3/2002 | Guedalia |
| 6,360,211 B1 | 3/2002 | Anderson et al. |
| 6,381,644 B2 | 4/2002 | Munguia et al. |
| 6,401,120 B1 | 6/2002 | Gamache et al. |
| 6,418,415 B1 | 7/2002 | Walker et al. |
| 6,418,420 B1 | 7/2002 | DiGiorgio et al. |
| 6,418,467 B1 | 7/2002 | Schweitzer et al. |
| 6,430,538 B1 | 8/2002 | Bacon et al. |
| 6,449,744 B1 | 9/2002 | Hansen |
| 6,452,609 B1 | 9/2002 | Katinsky et al. |
| 6,453,353 B1 | 9/2002 | Win et al. |
| 6,460,041 B2 | 10/2002 | Lloyd |
| 6,466,949 B2 | 10/2002 | Yang et al. |
| 6,466,980 B1 | 10/2002 | Lumelsky et al. |
| 6,477,510 B1 | 11/2002 | Johnson |
| 6,486,891 B1 | 11/2002 | Rice |
| 6,499,036 B1 | 12/2002 | Gurevich |
| 6,507,826 B1 | 1/2003 | Maners |
| 6,516,327 B1 | 2/2003 | Zondervan et al. |
| 6,523,027 B1 | 2/2003 | Underwood |
| 6,535,294 B1 | 3/2003 | Arledge, Jr. et al. |
| 6,539,396 B1 | 3/2003 | Bowman-Amuah |
| 6,578,068 B1 | 6/2003 | Bowman-Amuah |
| 6,589,290 B1 | 7/2003 | Maxwell et al. |
| 6,594,819 B1 | 7/2003 | Ciarlante et al. |
| 6,601,084 B1 | 7/2003 | Bhaskaran et al. |
| 6,606,643 B1 | 8/2003 | Emens et al. |
| 6,611,822 B1 | 8/2003 | Beams et al. |
| 6,631,382 B1 | 10/2003 | Kouchi et al. |
| 6,631,402 B1 | 10/2003 | Devine et al. |
| 6,643,690 B2 | 11/2003 | Duursma et al. |
| 6,668,253 B1 | 12/2003 | Thompson et al. |
| 6,681,229 B1 | 1/2004 | Cason et al. |
| 6,684,384 B1 | 1/2004 | Bickerton et al. |
| 6,686,932 B2 | 2/2004 | Rath et al. |
| 6,687,731 B1 | 2/2004 | Kavak |
| 6,704,612 B1 | 3/2004 | Hahn-Carlson |
| 6,725,264 B1 | 4/2004 | Christy |
| 6,760,775 B1 | 7/2004 | Anerousis et al. |
| 6,772,167 B1 | 8/2004 | Snavely et al. |
| 6,785,822 B1 | 8/2004 | Sadhwani-Tully |
| 6,801,949 B1 | 10/2004 | Bruck et al. |
| 6,826,542 B1 | 11/2004 | Virgin et al. |
| 6,834,294 B1 | 12/2004 | Katz |
| 6,839,680 B1 | 1/2005 | Liu et al. |
| 6,847,953 B2 | 1/2005 | Kuo |
| 6,853,630 B1 | 2/2005 | Manning |
| 6,882,983 B2 | 4/2005 | Furphy et al. |
| 6,886,134 B1 | 4/2005 | Cason |
| 6,922,671 B2 | 7/2005 | Musa et al. |
| 6,928,411 B1 | 8/2005 | Fox et al. |
| 6,934,690 B1 | 8/2005 | Van Horn et al. |
| 6,947,063 B1 | 9/2005 | Cirulli et al. |
| 6,950,983 B1 | 9/2005 | Snavely |
| 6,965,938 B1 | 11/2005 | Beasley et al. |
| 6,971,107 B2 | 11/2005 | Sjostrom et al. |
| 7,003,474 B2 | 2/2006 | Lidow |
| 7,133,868 B1 | 11/2006 | Ruest et al. |
| 7,155,403 B2 | 12/2006 | Cirulli et al. |
| 7,171,374 B1 | 1/2007 | Sheehan et al. |
| 7,197,480 B1 | 3/2007 | Chollon et al. |
| 7,243,077 B2 | 7/2007 | Broden et al. |
| 7,266,503 B2 | 9/2007 | Cason et al. |
| 7,283,976 B2 | 10/2007 | Aber et al. |
| 7,349,879 B2 | 3/2008 | Alsberg et al. |
| 7,356,496 B2 | 4/2008 | Kane et al. |
| 7,363,246 B1 | 4/2008 | Van Horn et al. |
| 7,386,495 B2 | 6/2008 | Cirulli et al. |
| 7,835,956 B2 | 11/2010 | Aber et al. |
| 7,848,970 B2 | 12/2010 | Kane et al. |
| 7,895,095 B2 | 2/2011 | Chollon et al. |
| 7,983,958 B2 | 7/2011 | Broden et al. |
| 2001/0011222 A1 | 8/2001 | McLauchlin et al. |
| 2001/0032162 A1 | 10/2001 | Alsberg et al. |
| 2001/0051913 A1 | 12/2001 | Vashistha et al. |
| 2002/0019740 A1 | 2/2002 | Matsuo et al. |
| 2002/0055878 A1 | 5/2002 | Burton et al. |
| 2002/0065736 A1 | 5/2002 | Willner et al. |
| 2002/0065885 A1 | 5/2002 | Buonanno et al. |
| 2002/0087441 A1 | 7/2002 | Wagner, Jr. et al. |
| 2002/0091597 A1 | 7/2002 | Teng |
| 2002/0093538 A1 | 7/2002 | Carlin |
| 2002/0103731 A1 | 8/2002 | Barnard et al. |
| 2002/0107890 A1 | 8/2002 | Gao et al. |
| 2002/0128944 A1 | 9/2002 | Crabtree et al. |
| 2002/0138281 A1 | 9/2002 | Cirulli et al. |
| 2002/0138658 A1 | 9/2002 | Sjostrom et al. |
| 2002/0143699 A1 | 10/2002 | Baumann et al. |
| 2002/0161606 A1 | 10/2002 | Bennett et al. |
| 2002/0161667 A1 | 10/2002 | Felkey et al. |
| 2002/0184111 A1 | 12/2002 | Swanson |
| 2002/0184125 A1 | 12/2002 | Cirulli et al. |

| | | |
|---|---|---|
| 2003/0074580 A1 | 4/2003 | Knouse et al. |
| 2003/0093320 A1 | 5/2003 | Sullivan |
| 2003/0139996 A1 | 7/2003 | D'Antoni et al. |
| 2003/0187688 A1 | 10/2003 | Fey et al. |
| 2003/0220875 A1 | 11/2003 | Lam et al. |
| 2004/0015367 A1 | 1/2004 | Nicastro et al. |
| 2004/0078275 A1 | 4/2004 | Ismert et al. |
| 2005/0097016 A1 | 5/2005 | Barnard et al. |
| 2007/0179894 A1 | 8/2007 | Cirulli et al. |
| 2008/0071653 A1 | 3/2008 | Cirulli et al. |

FOREIGN PATENT DOCUMENTS

| | | |
|---|---|---|
| WO | WO 98/49639 | 11/1998 |

OTHER PUBLICATIONS

Lotus Development Corp., an IBM Subsidiary. Lotus Domino: Domino Enterprise Integration Guide, Rel. 5. USA, privately printed, 1998. 9-20, 107-122, 444-451.

Berners-Lee et al.; "Uniform Resource Locators (URL)"; Request for Comments (RFC) 1738; Dec. 1994.

Brown et al.; "Mastering Lotus Notes"; pp. 6-15, 486-483; ISBM 0782113028; 1995.

Tewari et al.; "High Availability in Clustered Multimedia Servers"; Proceedings of the Twelfth International Conference on Data Engineering; pp. 645-654; Feb. 1996.

Cardellini et al.; "Redirection algorthims for load sharing in distributed Web-server systems"; Proceedings. 19th IEEE International Conference on Distributed Computing Systems; pp. 528-535; May 1999.

John D'Esposito. Proxy Pass Implementation in GWA. Undated. 13 pages. Published before Sep. 6, 2000 on the Internet at <htt;://w3.ibm.com/media/juke/presenter/gwa/proxy/proxy.html>.

Sun Microsystems, Inc. Java 2 Enterprise Edition Technical Documentation. Copyright 1999. 1 page.

Sun Microsystems, Inc. Java 2 Enterprise Edition Developer's Guide. Copyright 1999. Table of Contents (7 pages) and Chapter 8 "Security" (10 pages).

Dynamic HTML in Action Written by William J. Pardi and Eric Schurman, 1998.

Gershenfeld, Nancy; "Client-server: What Is It and Are We There Yet?" Online. Medford: Mar. 1995. vol. 19, Iss. 2; p. 60, 6 pages.

University of New Hampshire Financial and Administrative Procedures, 1994, 11 pages.

Minnesota Statewide Administrative Systems webpage describing three way match, Jun. 29, 1995, 1 page.

US Dept. of Energy, I-Manage Stars Functional and Technical Requirements, Sep. 2000, 54 pages.

All Open Orders for Customer, Nov. 23, 1999, Motorola.

Elaine Marmel and Diane Koers, Peachtree 8 for Dummies, © 2000, Hungry Minds, Inc.

David Kroenke, Database Processing, © 1983, 1977, Science Research Associates, Inc.

Deitel & Deitel, Java How to Program, © 1998, 1997, Prentice-Hall.

State of Texas Statewide Electronic Commerce Feasibility Study; May 15, 1998; Phoenix Planning & Evaluation, LTD. Rockville, MD 20852.x.

Yehuda Shiran; Sharing functions between frames, Jul. 29, 2000.

JavaScrip and Frames, Part II—The Famous Memory Game, Apr. 5, 1999.

Tom Negrino, JavaScript for the World Wide Web: Visual Quickstar Guide (3rd Edition), 2000.

Baron et al.; "Web-based E-catalog systems inB2B procurement", Association for Computing Machinery, May 2000, vol. 43 No. 5, p. 93+.

van Riel et al.; "Exploring consumer evaluations of e-services: a portal site", International Journal of Service Industry Management, 2001, vol. 12 No. 3, p. 359+.

USBI bill dated Jul. 22, 1998. two web site pages with background on USBI (www.billview.com and www.billingconcepts.com).

Valentine, Lisa. "Banks' accounting systems showing their age." Bank Technology News Nov. 1, 1998: Banking Information Source, ProQuest. Web. Jul. 13, 2010.

"IBM and MarketMile Forge e-business On Demand Alliance". Business Editors/High-Tech Writers. Business Wire. Feb. 19, 2002. [recovered from Dialog database Jul. 2, 2007].

"Supply Side e-conomics". Duey, Rhonda. Oil and Gas Investor. May 2000 [recovered from DIALOG database Jul. 2, 2007].

X12 Transaction Set Index Version 3040, undated, 4 pages, retrieved from the Internet on Nov. 3, 2005.

Office Action (Mail Date Apr. 3, 2012) for U.S. Appl. No. 13/184,682, filed Jul. 18, 2011; Confirmation No. 1917.

SYSTEM FOR PROCESSING A PURCHASE REQUEST FOR GOODS OR SERVICES

CROSS REFERENCES TO RELATED APPLICATIONS

This application is a continuation application claiming priority of Ser. No. 09/819,462, filed Mar. 28, 2001, now U.S. Pat. No. 8,027,892, issued Sep. 27, 2011.

The following U.S. patent applications, filed concurrently or otherwise copending, are assigned to the assignee hereof and contain subject matter related, in certain respect, to the subject matter of the present application.

Ser. No. 09/657,215, filed 7 Sep. 2000, entitled "System and Method for Clustering Servers for Performance and Load Balancing";

Ser. No. 09/657,216, filed 7 Sep. 2000, entitled "System and Method for Front End Business Logic and Validation";

Ser. No. 09/657,217, filed 7 Sep. 2000, entitled "System and Method for Data Transfer With Respect to External Applications";

Ser. No. 09/656,037, filed 7 Sep. 2000, entitled "System and Method for Providing a Relational Database Backend";

Ser. No. 09/656,803, filed 7 Sep. 2000, entitled "System and Method for Providing a Role Table GUI via Company Group";

Ser. No. 09/656,967, filed 7 Sep. 2000, entitled "System and Method for Populating HTML Forms Using Relational Database Agents";

Ser. No. 09/657,196, filed 7 Sep. 2000, entitled "System and Method for Catalog Administration Using Supplier Provided Flat Files"; and Ser. No. 09/657,195, filed 7 Sep. 2000, entitled "System and Method for Providing an Application Navigator Client Menu Side Bar".

Ser. No . 09/815,318, entitled "SYSTEM AND METHOD FOR GENERATING A COMPANY GROUP USER PROFILE".

Ser. No. 09/819,437, entitled "SYSTEM AND METHOD FOR SHARING DATA ACROSS FRAMES USING ENVIRONMENT VARIABLES".

Ser. No. 09/815,317, entitled "SYSTEM AND METHOD FOR SYNCHRONIZING LEDGER ACCOUNTS BY COMPANY GROUP".

Ser. No. 09/815,320, entitled "SYSTEM AND METHOD FOR GROUPING COMPANIES ACCORDING TO ACCOUNTING SYSTEM OR RULES".

Ser. No. 09/815,316, entitled "SYSTEM AND METHOD FOR FRAME STORAGE OF EXECUTABLE CODE".

Ser. No. 09/815,313, entitled "SYSTEM AND METHOD FOR INVOICE IMAGING THROUGH NEGATIVE CONFIRMATION PROCESS".

Ser. No. 09/815,312, entitled "SYSTEM AND METHOD FOR LEVERAGING PROCUREMENT ACROSS COMPANIES AND COMPANY GROUPS".

Ser. No. 09/816,264, entitled "SYSTEM AND METHOD FOR PROCESSING TAX CODES BY COMPANY GROUP".

Ser. No. 09/798,598, filed 2 Mar. 2001, entitled "SYSTEM AND METHOD FOR MANAGING INTERNET TRADING NETWORKS".

The above-identified patent applications are incorporated herein by reference.

TECHNICAL FIELD OF THE INVENTION

This invention pertains to procurement systems. More particularly, it relates to a method and system for automating the payment of invoices, particularly useful for goods and services not coming through a receiving dock, including automating preparation of a move ticket responsive to requestor entered positive confirmation.

BACKGROUND OF THE INVENTION

Background Art

Historically, payments of invoices are triggered by a three way match: the invoice must match the purchase order (PO) terms and conditions, and the goods received must match those stated in quality and quantity against that PO. A problem occurs, particularly with respect to general procurement items, when such items are not tangible things which come through a receiving dock. It this case, it is difficult to do the three way match. For example, services may not flow through dock. As a result, procurement systems have defined an "invoice not received" situation, which results in payment not being made until someone does something—and that initiates what is referred to as a paper chase. There is a need in the art to improve upon the paper chase situation by eliminating the receipt process.

Some procurement systems implement a "negative confirmation" process which results in payment of an invoice unless a requester submits a rejection. In this process, when an invoice is received, a notification is given to the requester alerting him to fact that the invoice will be paid unless requester sends back a notification that it should not be paid.

The problem with negative authorization is that, while it may work fine for low cost things, for larger (more expensive) things, the risk that payment will be made before negative confirmation could be received my be too great.

It is an object of the invention to provide an improved business process for general procurement and accounts payable activities.

It is a further object of the invention to provide a system and method for automating the preparation of move tickets based on requestor entered positive confirmation.

It is a further object of the invention to provide a system and method for automatically providing invoice information to a front end requisition and catalog system keyed off of receipt of an invoice by a back end procurement services system.

SUMMARY OF THE INVENTION

A system and method for approving and paying an invoice for commodities, the method including the steps of receiving an invoice for commodities from a vendor; generating from the invoice a notification to an authorizer that includes information needed to pay the invoice and a selectable button for authorizing or rejecting payment; and responsive to authorization creating an automated receipt transaction file and entering the transaction file into a system for payment.

In accordance with an aspect of the invention, there is provided a computer program product configured for approving and paying an invoice.

Other features and advantages of this invention will become apparent from the following detailed description of the presently preferred embodiment of the invention, taken in conjunction with the accompanying drawings.

BEST MODE FOR CARRYING OUT THE INVENTION

In accordance with the preferred embodiment of the invention, a system and method is provided for processing invoices. Further, a negative confirmation process is modified so that a positive confirmation may be required for selected commodity code and company code.

Figure 1:
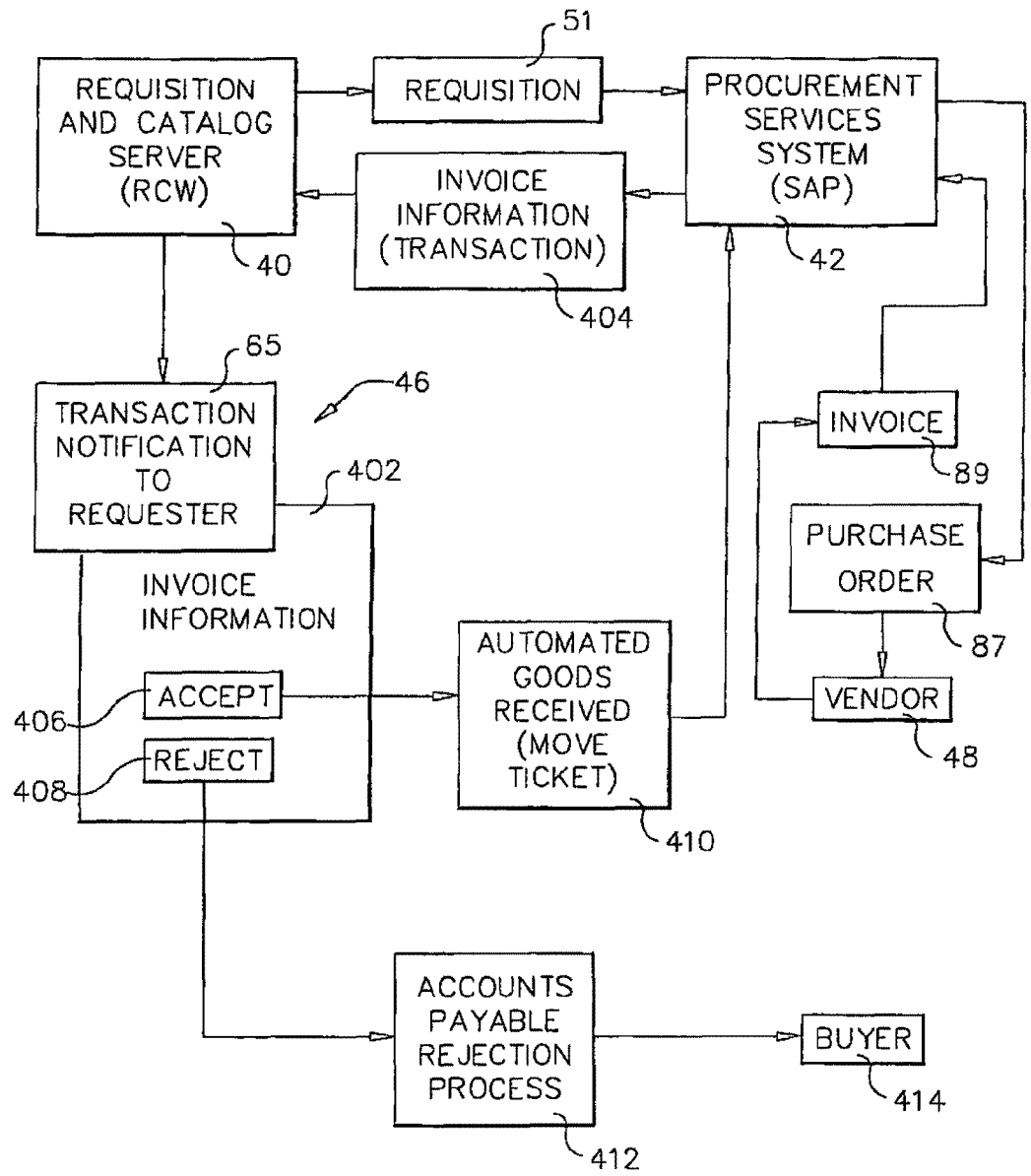
FIG. 1 is a system and flow diagram illustrating the preferred embodiment of the invention for processing invoices.

Referring to FIG. 1, an invoice processing system includes a requisition and catalog server (referred to as a Req/Cat Web, or RCW, server) 40, a procurement services system (SAP) 42, and a requester terminal (browser) 46. ReqCat Web 40 allows requesters to input requirements (requisitions) 51 which Req-Cat then passes to SAP 42, which creates purchase orders 87, sends them to vendors 48 for fulfillment, receives the vendors invoices 89, and prepares the payments. Companies have the option of designating various commodities as either receivable or non-receivable, and this designation is stored in Req-Cat web 40 and passed to SAP 42 on inbound requisitions 51.

In operation, responsive to a purchase request entered by a requestor at browser 46, front end RCW server 40 generates and sends to back end SAP server a requisition 51. SAP 42 generates therefrom a purchase order 87 for transmission (if electronic) or delivery (if paper or fax) to vendor 48. The requisition and resulting purchase order may be materials or services selected from a catalog maintained at RCW 40 and accessed by requestor 46.

In accordance with the terms and conditions of the purchase order 87, vendor 48 returns an invoice 89 to SAP server 42 requesting payment for the goods or services. Responsive to receipt of invoice 89, SAP 42 prepares and communicates transaction information 404 to RCW 40, and RCW 40 provides that information in transaction notification 65 to requestor 46 in a format, such as a window or frame, including the transaction information 404 and a selection device, such as buttons 406 and 408, or the like, for accepting or rejecting the invoice.

In the event that requestor 46 accepts the invoice, or authorizes payment, an automated goods received (move ticket) is generated back to SAP system 42 and payment made without further human intervention. In the event that requestor 46 rejects the invoice, an accounts payable rejection process 412 is initiated which, in an exemplary embodiment, may involve buyer 414 in advising vendor 48 of the rejection.

Figure 2:
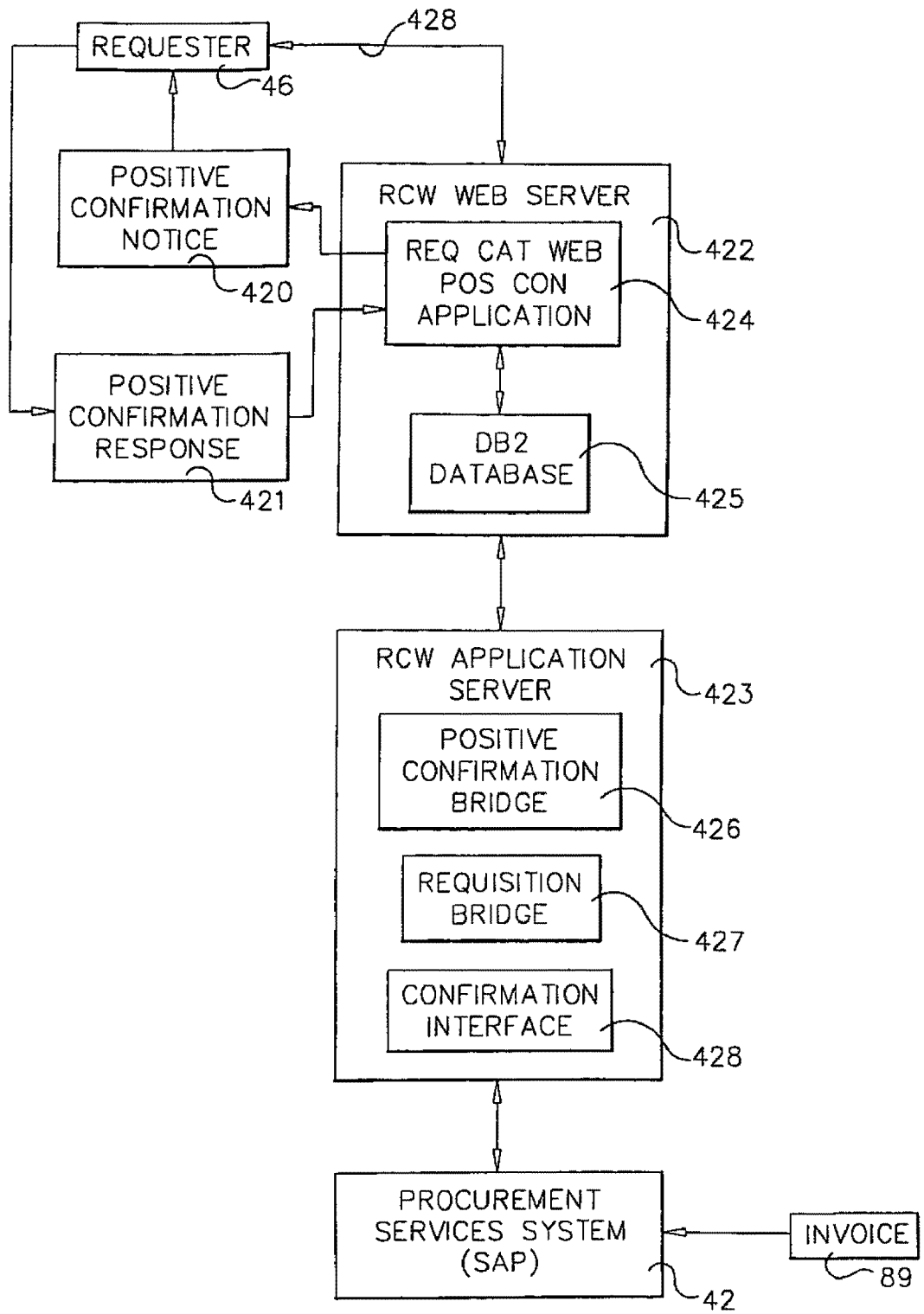
FIG. 2 is a system and flow diagram further illustrating the preferred embodiment of the invention.

Referring to FIG. 2, the invoice processing system of the preferred embodiment of the invention includes a requester terminal 46, a Req/Cat Web web server 422, a Req/Cat web application server 423 and a procurement services system (SAP) 42. Web server 422 includes a positive confirmation application 424 and a database 425, and application server includes an execution engine, a requisition bridge 427 and confirmations interface 428 to SAP system 42.

A positive confirmation process implemented by the system of FIG. 2 provides the following functions:
(1) Providing notification 420 to requester 46 that an invoice 89 requiring positive confirmation has been received.
(2) Recording the acceptance or rejection 421 of payment of the invoice to database 425, herein an IBM DB2 database.
(3) Notifying SAP 42 using an automated bridge 427 when payment of an invoice is accepted.
(4) Notifying Accounts Payable when payment is rejected.

An inbound bridge executed in positive confirmation bridge 426 provides for marking inbound invoice 89 line items as requiring positive confirmation.

Requesters 46 are provided notice 420 of invoices which require positive confirmation. This notice directs the user (aka requester or authorizer) to a location where the positive confirmation can be performed. The terms user, requester, authorizer are used to refer to persons requesting commodities, which may be tangible goods or intangible goods, such as services, and to persons acting on behalf of or in lieu of such persons. A user interface represented by line 428 and executed by application 424 is provided to database 425 for requester 46 to enter an invoice ID and obtain access to the invoice data. This interface also provides a method for accepting or rejecting the invoice, that is, for providing positive confirmation response 421. By using log information, users are prevented from accessing an invoice that is not their own. The interface 424 records acceptance or rejection of payment in database 425.

Positive confirmation notices 420, sent by e-mail to requester 46, direct the requester to review a positive confirmation notice within Req/Cat 422.

On a scheduled basis mail is generated to notify accounts payable (AP) of any new invoice items for which payment has been rejected. On a scheduled basis a bridge, possibly implemented within positive confirmation bridge 426, sends data from database 425 to SAP 42 for any new invoice items for which payment has been accepted.

This bridge executed within positive confirmation bridge 426 may be written to extract positive confirmation responses received by RCW 422 from requesters 46, and pass the extracted file of responses to SAP 42 for posting as goods receipts.

Companies for which the procurement services system (SAP) are provided have the option of designating commodities as either receivable or non-receivable. Commodities designated as non-receivable follow a traditional negative confirmation process for payment authorization. Commodities designated as receivable and that were sourced from ReqCat Web 423 require a positive confirmation 421 from the requester 46 to authorize payment to proceed.

SAP 42 passes a confirmations interface 428 to RCW server 423 containing invoices 89 posted against both receivable and non-receivable purchase order (PO) items. 1 Those invoices posted against non-receivable PO items are considered negative confirmation records, and those invoices posted against receivable PO items are considered positive confirmation records. ReqCat Web 422 notifies requester 46 of positive confirmation conditions which require his/her action. The requester logs on to ReqCat Web 422 and responds to the positive confirmation notice 420 by indicating that all goods invoiced have been received. ReqCat Web updates the appropriate positive confirmation record in database 425 with the positive confirmation response 421.

On a daily basis, positive confirmation bridge 426 invokes a map to identify all positive confirmation responses 421 recorded in database 425 since last execution. This map within bridge 426 creates an output file of all positive confirmation responses recorded since the map was last executed. A delivery component in server 423 is then invoked to initiate transfer of the output file to SAP 42. Upon successful transfer of the positive confirmation file to SAP 42, a SAP goods receipt map formats the incoming data as required by SAP and invokes a SAP material movement IDOC function to post the goods receipt against the corresponding purchase order item.

All transmissions for positive confirmation records to SAP 42 are initiated by the sending system 423. A script on the ReqCat Web application sever 423 is scheduled to run on a periodic, say daily, basis to invoke a map which identifies all positive confirmation responses recorded since the map was last executed and create an output file of those responses and invoke a delivery component in SAP 42. On the SAP 42 side of the transfer, a bridge receives the output file as a goods movement IDOC file, and a script executes within SAP 42 to receive the file, do trailer processing, copy the input file to a history file, raise an SAP user event to start a job to create SAP goods movement documents and post the goods receipt documents in support of eventual payments against the approved invoices to the vendor.

Advantages over the Prior Art

It is an advantage of the invention that there is provided an improved business process for general procurement and accounts payable activities.

It is a further advantage of the invention that there is provided a system and method for automating the preparation of move tickets based on requestor entered positive confirmation.

It is a further advantage of the invention that there is provided a system and method for automatically providing invoice information to a front end requisition and catalog system keyed off of receipt of an invoice by a back end procurement services system.

Alternative Embodiments

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure its components in accordance with the system of the invention.

Further, each step of the method may be executed on any general computer, such as an IBM System 390, AS/400, PC or the like and pursuant to one or more, or a part of one or more, program elements, modules or objects generated from any programming language, such as C++, Java, Pl/1, Fortran or the like. And still further, each said step, or a file or object or the like implementing each said step, may be executed by special purpose hardware or a circuit module designed for that purpose.

Accordingly, the scope of protection of this invention is limited only by the following claims and their equivalents.

We claim:

1. A system, comprising a front end server, a back end server, and at least one physically tangible computer readable storage device storing computer readable program instructions, said front end server and said back end server configured to execute said program instructions to implement a method for processing a purchase request for goods or services, said method comprising:

receiving, by a front end server from a requestor, the purchase request for goods or services, said goods or services having a designation denoting that the goods or services are receivable which requires a positive confirmation from the requestor to provide authorization to pay for the goods and services, said designation being stored in the front end server, an invoice processing system comprising the front end server, an application server and a back end server, said back end server coupled to the front end server via the application server, said front end server comprising a positive confirmation application and a database, said application server comprising a positive confirmation bridge;

sending, by the front end server to the back end server, a requisition comprising requirements relating to the received purchase request and including the designation;

generating, by the back end server in response to receiving the requisition sent by the front end server, a purchase order based on the requisition;

said back end server transmitting or delivering the purchase order to a vendor that can provide the requested goods or services;

after said transmitting or delivering the purchase order to the vendor, said application server receiving an invoice from the vendor, said invoice referencing the purchase order and requesting payment for the goods or services;

after said application server receiving the invoice from the vendor, said positive confirmation bridge marking the invoice to indicate that said positive confirmation is required;

after said positive confirmation bridge marking the invoice, said back end server receiving the invoice from the application server;

responsive to said back end server receiving the invoice from the positive confirmation bridge, said back end server communicating transaction information pertaining to the invoice to the front end server;

after said communicating transaction information, said positive confirmation application providing notice to the requestor that the invoice has been received and that the invoice includes the required positive confirmation, said notice directing the requestor to a location where the positive confirmation can be performed;

after said providing notice to the requestor, said front end server receiving a response from the requestor for authorizing or rejecting payment for the goods or services; and after said front end server receiving the response, said front end server recording the response in the database.

2. The system of claim 1, wherein the received response is for authorizing payment for the goods.

3. The system of claim 2, wherein the application server further comprises a requisition bridge, wherein the method further comprises: after said receiving the response, said application server notifying the back end server via the requisition bridge that payment for the goods has been authorized.

4. The system of claim 1, wherein the received response is for rejecting payment for the goods.

5. The system of claim 1, wherein the notice directs the requestor to a location where the positive confirmation can be performed.

6. The system of claim 1, wherein the application server further comprises a confirmation interface to the database, wherein the confirmation interface is configured to be executed by the positive confirmation application, and wherein the method further comprises after said providing notice and before said receiving the response: providing the confirmation interface to the requester to enable the requestor to both enter an identifier of the invoice and obtain access to data comprised by the invoice.

7. The system of claim 6, wherein said receiving the response is performed via the confirmation interface.

8. A computer program product, comprising at least one physically tangible computer readable storage device storing computer readable program instructions, said program instructions configured to be executed by a computer system to implement a method for processing a purchase request for goods or services, said method comprising:

receiving, by a front end server from a requestor, the purchase request for goods or services, said goods or services having a designation denoting that the goods or services are receivable which requires a positive confirmation from the requestor to provide authorization to pay for the goods and services, said designation being stored in the front end server, an invoice processing system comprising the front end server, an application server and a back end server, said back end server coupled to the front end server via the application server, said front end server comprising a positive confirmation application and a database, said application server comprising a positive confirmation bridge;

sending, by the front end server to the back end server, a requisition comprising requirements relating to the received purchase request and including the designation;

generating, by the back end server in response to receiving the requisition sent by the front end server, a purchase order based on the requisition;

said back end server transmitting or delivering the purchase order to a vendor that can provide the requested goods or services;

after said transmitting or delivering the purchase order to the vendor, said application server receiving an invoice from the vendor, said invoice referencing the purchase order and requesting payment for the goods or services;

after said application server receiving the invoice from the vendor, said positive confirmation bridge marking the invoice to indicate that said positive confirmation is required;

after said positive confirmation bridge marking the invoice, said back end server receiving the invoice from the application server;

responsive to said back end server receiving the invoice from the positive confirmation bridge, said back end server communicating transaction information pertaining to the invoice to the front end server;

after said communicating transaction information, said positive confirmation application providing notice to the requestor that the invoice has been received and that the invoice includes the required positive confirmation, said notice directing the requestor to a location where the positive confirmation can be performed;

after said providing notice to the requestor, said front end server receiving a response from the requestor for authorizing or rejecting payment for the goods or services; and after said front end server receiving the response, said front end server recording the response in the database.

9. The computer program product of claim 8, wherein the received response is for authorizing payment for the goods.

10. The computer program product of claim 9, wherein the application server further comprises a requisition bridge, wherein the method further comprises: after said receiving the response, said application server notifying the back end server via the requisition bridge that payment for the goods has been authorized.

11. The computer program product of claim 8, wherein the received response is for rejecting payment for the goods.

12. The computer program product of claim 8, wherein the notice directs the requestor to a location where the positive confirmation can be performed.

13. The computer program product of claim 8, wherein the application server further comprises a confirmation interface to the database, wherein the confirmation interface is configured to be executed by the positive confirmation application, and wherein the method further comprises after said providing notice and before said receiving the response: providing the confirmation interface to the requester to enable the requestor to both enter an identifier of the invoice and obtain access to data comprised by the invoice.

14. The computer program product of claim 13, wherein said receiving the response is performed via the confirmation interface.

* * * * *